US008484228B2

(12) United States Patent
Bhattacharyya et al.

(10) Patent No.: US 8,484,228 B2
(45) Date of Patent: Jul. 9, 2013

(54) EXTRACTION AND GROUPING OF FEATURE WORDS

(75) Inventors: Chiranjib Bhattacharyya, Karnataka (IN); Himabindu Lakkaraju, Karnataka (IN); Kaushik Nath, Karnataka (IN); Sunil Arvindam, Karnataka (IN)

(73) Assignees: Indian Institute of Science, Bangalore (IN); SAP AG, Walldorf (DE)

( * ) Notice: Subject to any disclaimer, the term of this patent is extended or adjusted under 35 U.S.C. 154(b) by 0 days.

(21) Appl. No.: 13/049,922

(22) Filed: Mar. 17, 2011

(65) Prior Publication Data
US 2012/0239668 A1    Sep. 20, 2012

(51) Int. Cl.
*G06F 7/00*    (2006.01)
*G06F 17/30*   (2006.01)

(52) U.S. Cl.
USPC .......................... 707/754; 707/758; 707/778

(58) Field of Classification Search
USPC ....................................................... 707/754
See application file for complete search history.

(56) References Cited

U.S. PATENT DOCUMENTS

| | | | | |
|---|---|---|---|---|
| 2005/0149494 A1* | 7/2005 | Lindh et al. | | 707/3 |
| 2007/0112760 A1* | 5/2007 | Chea et al. | | 707/3 |
| 2008/0082499 A1* | 4/2008 | Koski | | 707/3 |
| 2008/0133488 A1* | 6/2008 | Bandaru et al. | | 707/3 |
| 2009/0094207 A1* | 4/2009 | Marvit et al. | | 707/3 |
| 2009/0204609 A1* | 8/2009 | Labrou et al. | | 707/5 |
| 2009/0265332 A1* | 10/2009 | Mushtaq et al. | | 707/5 |
| 2009/0319342 A1* | 12/2009 | Shilman et al. | | 705/10 |
| 2010/0049708 A1* | 2/2010 | Kawai et al. | | 707/5 |
| 2010/0094835 A1* | 4/2010 | Lu et al. | | 707/705 |
| 2011/0161071 A1* | 6/2011 | Duong-van | | 704/9 |
| 2012/0101808 A1* | 4/2012 | Duong-Van | | 704/9 |

OTHER PUBLICATIONS

Thomas Y. Lee, "Needs-Based Analysis of Online Customer Reviews", 2007.*
Ivan Titov, "Modeling Online Reviews with Multi-grain Topic Models", 2008.*
David M.Blei, Andrew Y.Nag and Michael I.Jordan; Latent Dirichlet Allocation; Journal of Machine Learning Research 3 (2003) 993-1022; Mar. 2003; JMLR.org, Cambridge, MA, USA; (http://www.cs.princeton.edu/~blei/papers/BleiNgJordan2003.pdf).
Christopher Scaffidi, Kevin Bierhoff, Eric Chang, Mikhael Felker, Herman NG and Chun Jin; Red Opal: Product-Feature Scoring from Reviews; Proceedings of the 8th ACM conference on Electronic commerce; 2007; ACM, New York, USA; (http://portal.acm.org/citation.cfm?id=1250938).

* cited by examiner

*Primary Examiner* — Binh V Ho

(57) ABSTRACT

Various embodiments of systems and methods for extraction and grouping of feature words are described herein. Feature words are obtained from a first corpus of text bodies comprising a plurality of reviews. A second corpus is created using a combination of the obtained feature words, verbs and adjectives from the first corpus. The second corpus comprises filtered reviews and each of the filtered reviews pertains to a review. Topics are preliminarily assigned for words in the filtered reviews of the second corpus. For each of the feature words in the second corpus, a topic count is determined for every preliminarily assigned topic. After determining the topic count, one or more of the topics are finally assigned to the feature words based on a topic count value. At least one topic is presented as a group of the feature words for which the at least one topic is assigned based on the topic count value.

18 Claims, 6 Drawing Sheets

EXTRACTION AND GROUPING OF FEATURE WORDS

FIELD

The field relates generally to collection of information from a corpus of text bodies. More particularly, the field relates to techniques for extracting and grouping feature words from a corpus of text bodies.

BACKGROUND

Opinions about a variety of topics and subjects are expressed by users in electronic form, especially on the Internet. For example, users of products and services typically express their opinions on relevant websites. Opinions expressed about a product (or service) may be related to one or more features of the product. There can also be general opinions that may not be particularly related to any feature of the product. Opinions can have positive, negative, or mixed tones about products or services. Each text body of such expression of opinions written in natural languages by an individual user can be referred to as a review.

For enterprises offering products or services, analysis of user reviews can be very useful. A meaningful analysis of the reviews would help enterprises better understand users' feedback and can offer valuable insights into the performance of product and service offerings. However, there can be numerous such reviews for any given product or service, leading to vast amount of data. Reading each review is not practically feasible. Analysis of only a fraction of the reviews (e.g., by sampling) may not be indicative of the overall picture and could result in incorrect conclusions.

It would therefore be desirable to provide a meaningful analysis of user reviews.

SUMMARY

Various embodiments of systems and methods for extraction and grouping of feature words are described herein. Feature words are obtained from a first corpus of text bodies comprising a plurality of reviews. A second corpus is created using a combination of the obtained feature words, verbs and adjectives from the first corpus. The second corpus comprises filtered reviews and each of the filtered reviews pertains to a review of the plurality of reviews. Topics are preliminarily assigned for words in the filtered reviews of the second corpus. For each of the feature words in the second corpus, a topic count is determined for every preliminarily assigned topic. After determining the topic count, one or more of the topics are finally assigned to the feature words based on a topic count value. At least one topic is presented on a user interface as a group of the feature words for which the at least one topic is assigned based on the topic count value.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for extraction and grouping of feature words are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
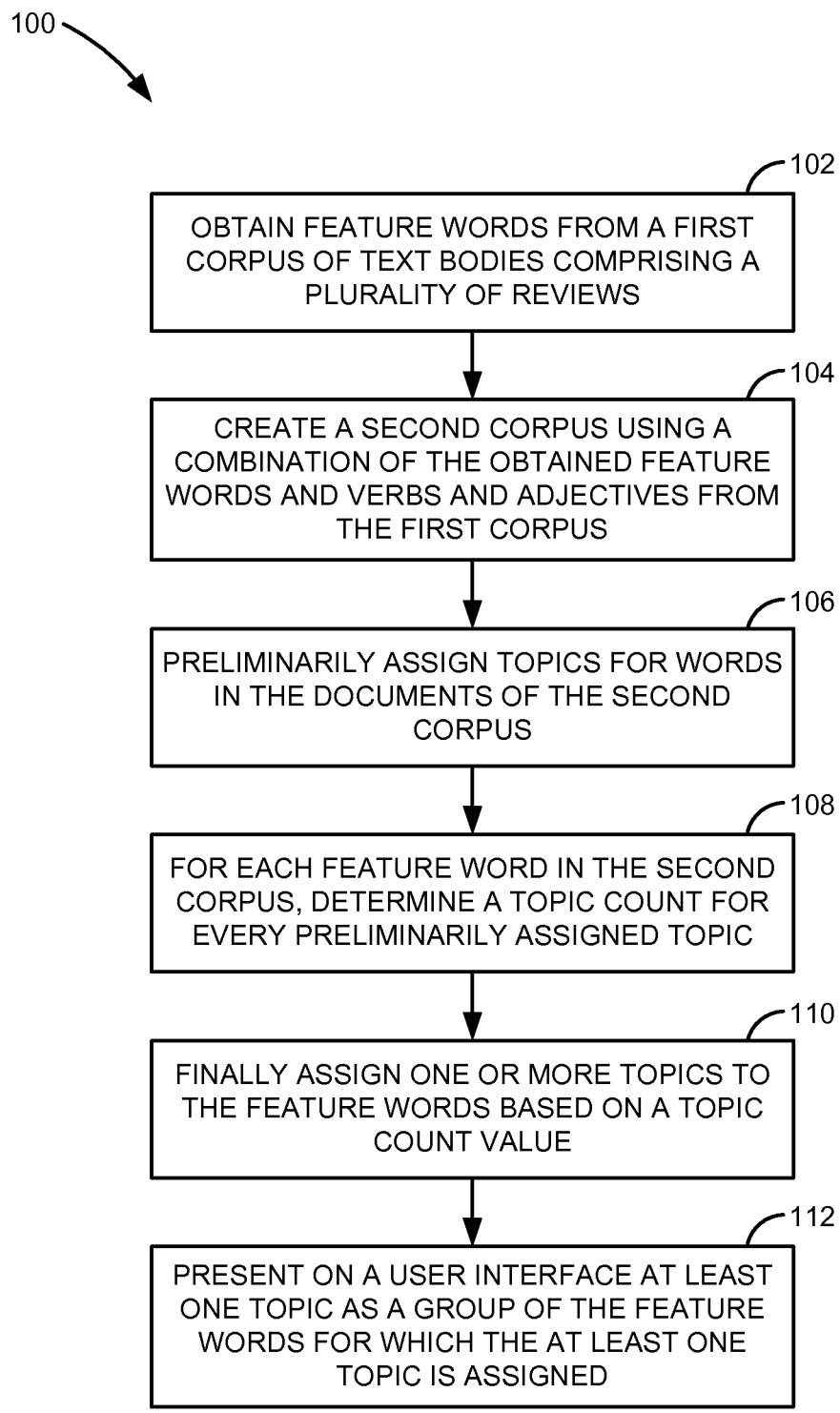
FIG. 1 is a flow diagram illustrating a method for extracting and grouping feature words from a corpus of text bodies, according to one embodiment.

FIG. 1 illustrates an embodiment of a method 100 for extracting and grouping feature words or feature terms from a first corpus of text bodies. The first corpus of text bodies includes a plurality of reviews. Each review pertains to an opinion expressed by a user about a particular subject, and features can be attributes or aspects pertaining to the subject of the first corpus. In the context of this method, the first corpus is a non-generic or biased corpus of text bodies. A non-generic corpus includes reviews that are related generally to a specific subject. For example, users can express opinions about products purchased by them, and the subject in such cases can be generally about a product (e.g., a mobile phone or a printer). A corpus that includes a plurality of reviews related to a product is a non-generic corpus and the feature words can include words related to attributes and components of that product. For a mobile phone, examples of feature words include 'QWERTY keyboard, 'e-mail application,' and '3G.' Similarly, a corpus including reviews related to a service offering is another non-generic corpus and feature words can be attributes and aspects of the service offering.

The method 100 is explained in reference to a non-generic corpus that includes reviews about products. However, it should be noted that the subjects are not confined to only products and services. There can be a variety of subjects on which users express their opinions and the method is applicable to all such subjects. Also, different subjects may have different feature words.

At 102, feature words from a first corpus of text bodies are obtained. The first corpus of text bodies is a collection of reviews in electronic form. In one embodiment, the reviews include opinions that are expressed by users on websites. Each review is a text body comprising one or more sentences in a natural language such as the English language. Feature words can be single words or compound words which are overly emphasized in a particular corpus of interest. For example, reviews about a printer product can include user opinions about aspects of the printer such as performance of the printer or problems with the printer. Feature words can include "nozzle" (a single word), "print head" (a compound word), "problems," and "replacement." These feature words are overly emphasized in that, generally, their frequency of occurrence within the first corpus is relatively high compared to other words. A detailed embodiment for obtaining the feature words from the first corpus is explained with reference to FIG. 2.

At 104, a second corpus of the text bodies is created. The second corpus is created using a combination of the feature words obtained at 102 and verbs and adjectives from the first corpus. In other words, the second corpus is created by retaining verbs, adjectives, and the obtained feature words from the first corpus. The second corpus is in a way a modified or processed first corpus. For example, consider that a review R1 in the first corpus includes a complete sentence. The same review R1 in the second corpus includes a combination of feature words, verbs, and adjectives. This kind of representation of a review in the second corpus is termed as a filtered review. Therefore, the second corpus includes a collection of filtered reviews.

Consider a snippet of a review R1 in the first corpus that reads "THIS IS A GOOD CAMERA WITH A SHARP AUTO-FOCUS. IT ALSO TAKES SHARP PICTURES."

Feature words are obtained from a plurality of such reviews. After creating the second corpus, a filtered review FR1 in the second corpus that corresponds to the review R1 can include the following sequence of words:

'GOOD ' 'CAMERA' 'SHARP' 'AUTO-FOCUS' 'TAKES' 'PICTURES'

At 106, topics are preliminarily assigned to each word in the filtered reviews of the second corpus. Topic models can be used for preliminarily assigning topics to the words in the filtered reviews. A topic model is a statistical model that discovers topics occurring in a collection of text documents. In one embodiment, Latent Dirichlet Allocation (a type of topic model) is used to assign topics for words in the filtered reviews. LDA methodology is described in "Latent Dirichlet Allocation—David M. Blei, Andrew Y. Ng, Michael I. Jordan; *Journal of Machine Learning Research*, Volume 3, 2003." LDA methodology is briefly described below.

Latent Dirichlet Allocation (LDA) is a generative probabilistic model of a corpus. A corpus is a collection of documents, where each document (w) in the corpus is treated as a sequence of N words and is denoted by $w=(w_1, w_2, \ldots, w_N)$. LDA treats a document in a corpus as a random mixture over latent topics, where each topic is characterized by a distribution of words. LDA assumes the following generative process for each document in a corpus:

Choose the number of words 'N' such that it follows a Poisson distribution with the parameter '$1/\mu$'
Choose '$\theta$' such that it is distributed as Dirichlet ($\alpha$)
For each of the words $w_n$ in the document a. Choose a topic $z_n$ which is distributed as Multinomial ($\theta$)
b. Choose a word $w_n$ from $p(w_n|z_n, \beta)$, a multinomial probability distribution conditioned on the topic $Z_n$ According to LDA, the dimensionality 'k' of the Dirichlet distribution (and thus the dimensionality of the topic variable 'z') is assumed to be known and fixed. Also, the word probabilities are parameterized by a 'k×V' matrix. $\beta$ is a 'k×V' matrix where $\beta_{i,j}=p(w^j=1|z^i=1)$, which is a fixed quantity to be estimated. The parameter $\alpha$ is a k-vector with components $\alpha_i>0$ and '$\theta$' is a k-dimensional Dirichlet random variable. The key inferential problem here is to estimate the hidden parameters $\theta$ and $z=\{z_1, z_2 \ldots z_N\}$, i.e., to estimate $p(\theta, z|w, \alpha, \beta)$ for each document in the corpus. Since this probability '$p(\theta, z|w, \alpha, \beta)$' is intractable to compute, variational parameters $\gamma$ and $\Phi$ are brought in to simplify the computation, resulting in the following variational distribution:

$$q(\theta, z|\gamma, \Phi) = q(\theta|\gamma) \cdot \pi q(z_n|\Phi(n))$$

Where '$\gamma$' is a Dirichlet parameter and $(\Phi_1, \ldots, \Phi_N)$ are multinomial parameters and the symbol '·' denotes multiplication operation.

An optimization problem is then formulated to determine the values of the variational parameters '$\gamma$' and '$\Phi$.' Finding a tight lower bound on the log-likelihood "log $p(w|\alpha,\beta)$" is equivalent to solving the following optimization problem:

$$(\gamma^*, \Phi^*) = \operatorname{argmin} D(q(\theta, z|\gamma, \Phi) \| p(\theta, z|w, \alpha, \beta))$$

Where 'argmin' stands for argument of minimum.

By solving the aforementioned optimization problem, the following equations are obtained:

$$\Phi_{ni} = \beta_{iwn} \cdot \exp\{E_q[\log(\theta_i)|\gamma]\} \qquad 1$$

$$\gamma_i = \alpha_i + \Sigma_{n=1\ to\ N} \Phi_{ni} \qquad 2$$

Where 'i' is the index corresponding to the topic and 'n' indexes the words in a document.

In order to estimate the corpus level parameters $\alpha$ and $\beta$, log likelihood of the data given by '$1(\alpha, \beta) = \Sigma \log p(w_d|\alpha, \beta)$' is maximized.

Since the quantity $p(w|\alpha, \beta)$ cannot be computed tractably, a variational EM procedure is used. E-step of the EM procedure involves finding the optimal values of the variational parameters using equations 1 and 2. M-step involves maximizing the lower bound on the log likelihood with respect to the model parameters $\alpha$ and $\beta$ for fixed values of variational parameters computed in the E-step. These two steps are repeated until the lower bound on the log likelihood converges. A summary of an embodiment employing LDA is shown below:

Input $\alpha$
Initialize $\beta$ matrix randomly with values $0 \leq \beta_{i,j} \leq 1$
Perform EM procedure, i.e., iteratively perform E-step and M-step until the lower bound on the log likelihood converges
On convergence, take max($\Phi_{ni}$) corresponding to each topic 'i' for each word '$w_n$' in a document and designate 'i' as the topic corresponding to that word.

The second corpus that is created at 104 is used as the corpus for processing using the LDA methodology. The filtered reviews in the second corpus will form the documents $w=(w_1, w_2, \ldots, w_N)$ as referred to in the LDA methodology. Since the filtered reviews in the second corpus only include a combination of feature words, verbs, and adjectives, the filtered reviews in the second corpus do not include coherent sentences. The second corpus is processed using the LDA methodology to assign topics to each word in the filtered reviews. After assigning topics, each word in each of these filtered reviews of the second corpus has an associated topic. The topic identification using LDA is implicit, without naming any topic. Topics are assigned to the feature words using topic identification numbers (topic 'i' as mentioned in the above description of LDA).

It should be noted that alternative techniques can be used for assigning topics. Examples of such techniques include Mixture of Unigrams model, Latent Semantic Indexing (LSI), and probabilistic Latent Semantic Indexing (pLSI). However, the LDA methodology has some advantages over the above techniques. For example, in a Mixture of Unigrams model, the word distributions can be viewed as representations of topics under the assumption that each document exhibits exactly one topic. This assumption is often limiting to effectively model a large collection of documents. In contrast, the LDA methodology allows documents to exhibit multiple topics to different degrees.

The pLSI model uses a training set of documents and the model learns the topic mixtures only for those documents on which it is trained. A difficulty with pLSI is that the number of parameters which must be estimated grows linearly with the number of training documents, leading to over-fitting. LDA methodology overcomes these problems by treating the topic mixture weights as a k-parameter hidden random variable rather than a large set of individual parameters which are explicitly linked to the training set. LDA methodology is a well-defined generative model and generalizes easily to new documents. LDA methodology also does not suffer from the over-fitting issues as the pLSI model.

After 106, each word in each filtered review of the second corpus has a preliminarily assigned topic. Therefore, each feature word in each filtered review also has a preliminarily assigned topic. At 108, for each feature word in the second corpus, a topic count for every preliminarily assigned topic is determined. A topic count is an aggregate of the number of preliminary assignments of a particular topic to a particular feature word across all the filtered reviews in the second corpus. For example, consider that 'Topic 1' is assigned to 'Feature word 1' twenty times across all the filtered reviews in the second corpus. Therefore, for the 'Feature word 1,' the topic count for 'Topic 1' is "20." Similarly, topic counts for all the topics are determined for all the feature words. Finally, for each feature word, there will be a topic count for every topic. An embodiment of topic count determination is explained in reference to FIG. 4.

At 110, one or more topics are assigned to feature words based on topic count values. In one embodiment, a topic having a highest topic count value associated with a feature word is assigned to that feature word. For example, consider that for 'Feature word 1,' the topic count values for the Topics 1, 2, and 3 are 20, 6, and 5, respectively. 'Topic 1' has the highest topic count value for the 'Feature word 1' and therefore is assigned to the 'Feature word 1.' In another embodiment, one or more topics are assigned based on a threshold topic count value relative to the highest topic count value. A threshold topic count value can be taken as a percentage of the highest topic count value. For example, if a highest topic count value is 'n' (e.g., 20) then topics having a threshold topic count value of at least 80 percent 'n' (i.e., 16) are assigned to the corresponding feature word.

After assigning topics to feature words based on the topic count values, topics are presented at 112 as a group of the feature words for which the topics are assigned. The group of feature words can be displayed on a user interface. For example, if 'Topic 1' is assigned to 'Feature word 1,' 'Feature word 4,' and 'Feature word 12,' then the 'Topic 1' is presented as a group including the 'Feature word 1,' 'Feature word 4,' and 'Feature word 12.' The topics can be presented as a list of feature words on a user interface. As another example, consider that 'Topic A' and 'Topic B' are assigned to feature word 'X,' 'Topic A' is assigned to features words 'Y' and 'Z,' and 'Topic B' is assigned to feature words 'P,' 'Q,' and 'M.' 'Topic A' is then presented as a group of the feature words 'X,' 'Y,' and 'Z' and 'Topic B' is presented as a group of the feature words 'X,' 'P,' 'Q,' and 'M.'

Each topic represents an implicit sense of a particular usage, purpose, or an aspect. If the first corpus includes reviews about a product such as a mobile phone, then each topic that is exposed as a group of feature words can represent an implicit sense of an aspect of the product. An aspect of a product is an abstraction comprising relations indicated by combinations of feature words. For example, a topic having feature words '3G,' 'Wireless Capability,' 'Qwerty Keyboard' and 'e-mail application' indicates an aspect 'e-mail capability' of a mobile phone. In another example, a topic having feature words 'problems,' 'customer support,' 'print head,' and 'nozzle' would implicitly indicate frequent co-occurrences of 'problems' with 'print head' and 'nozzle' of a printer product. Several such aspects can be obtained from a given non-generic corpus. A user looking at the groups of the feature words will be able to readily recognize aspects of that product.

A feature word can belong to more than one topic. For example, in a corpus including reviews on an electronic device such as a laptop or a camera, the feature word "magnesium alloy casing" (a compound word) can belong to a topic indicating "aesthetics" and a topic indicating "durability." The "aesthetics" topic is presented as a group of feature words including "magnesium alloy casing" and other feature words such as "looks" or "design" to which the "aesthetics" topic is assigned. The "durability" topic is presented as a group of feature words including "magnesium alloy casing" and other feature words such as "toughness" to which the "durability" topic is assigned.

Figure 2:
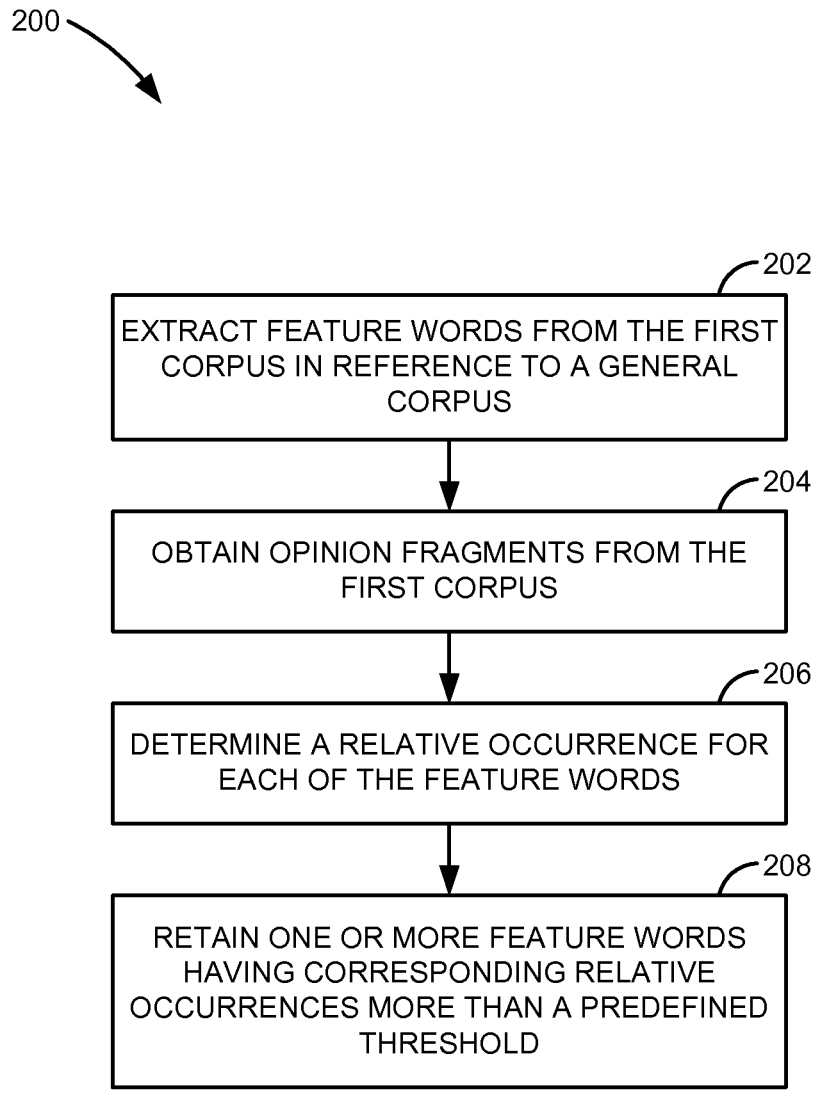
FIG. 2 is a flow diagram illustrating a method of obtaining feature words, according to one embodiment.

FIG. 2 illustrates an embodiment 200 for obtaining feature words from the first corpus. At 202, feature words are extracted from the first corpus using a feature extraction methodology. In one embodiment, the feature extraction methodology described in "*Red Opal: Product-Feature Scoring From Reviews*—Christopher Scaffidi, Kevin Bierhoff, Eric Chang, Mikhael Felker, Herman Ng, Chun Jin; *Proceedings of the 8th ACM conference on Electronic commerce, 2007*" is used. The Red Opal methodology considers that, for a corpus having reviews in the English language, feature words include single noun words or compound noun words. Examples of compound words include "wireless printer" or "wireless print capability." This assumption can be extended to any natural language. According to the Red Opal methodology, probabilities of occurrences of all possible noun words (both single and compound noun words) in a general corpus are generated. A general corpus is a large corpus of text bodies containing unspecific subjects. For example, a corpus containing around 1,000,000 text bodies of unspecific subjects can be considered as a general corpus. The frequencies of occurrences of the noun words in a first corpus are then calculated. The first corpus is a non-generic corpus that includes reviews related to a specific subject, e.g., about a product, following which, a score for each noun word is calculated. The noun words having a score more than a threshold value are retained as the feature words. A detailed embodiment of extracting feature words based on the Red Opal methodology is described in reference to FIG. 3.

At 204, opinion fragments are obtained from the first corpus. In one embodiment, a text analyzer tool such as BUSINESSOBJECTS™ TEXT ANALYSIS (a product of SAP AG, Germany) is used to obtain opinion fragments. Opinion fragments are obtained by fragmenting sentences in the reviews based on certain rules. These rules isolate opinions fragments, i.e., a series of words, in the sentences. Consider the sentence, "The pictures are good, but the flash is horrible." An example rule to isolate the opinion fragments could be "the occurrence of the word 'but' preceded by an adjective and a noun and succeeded by an adjective and a noun." On applying this rule the following opinion fragments can be obtained: opinion fragment 1 including "The pictures are good" and opinion fragment 2 including "The flash is horrible." Several such rules can be used to obtain opinion fragments and the above rule is only an example.

At 206, relative occurrences for feature words are determined based on their occurrences within the opinion fragments and within the first corpus. Specifically, for a given feature word extracted at step 202, the occurrence of that feature word within the opinion fragments is counted as a percentage of its total occurrence in the first corpus. This percentage is termed as the relative occurrence. Relative occurrences are determined for each feature word. In one embodiment, if a particular feature word is referred in an opinion fragment by means of Anaphora Resolution, then that feature word is considered as occurring within the opinion fragments. At 208, feature words having corresponding relative occurrences more than a pre-determined threshold are retained. This threshold can be a qualitative estimate based on manual inspection of the feature words. For example, the threshold can be taken as 'three' and feature words with relative occurrences of more than three are retained. These retained feature words are the feature words that are used for creating a second corpus (i.e., at 104 in FIG. 1).

Figure 3:
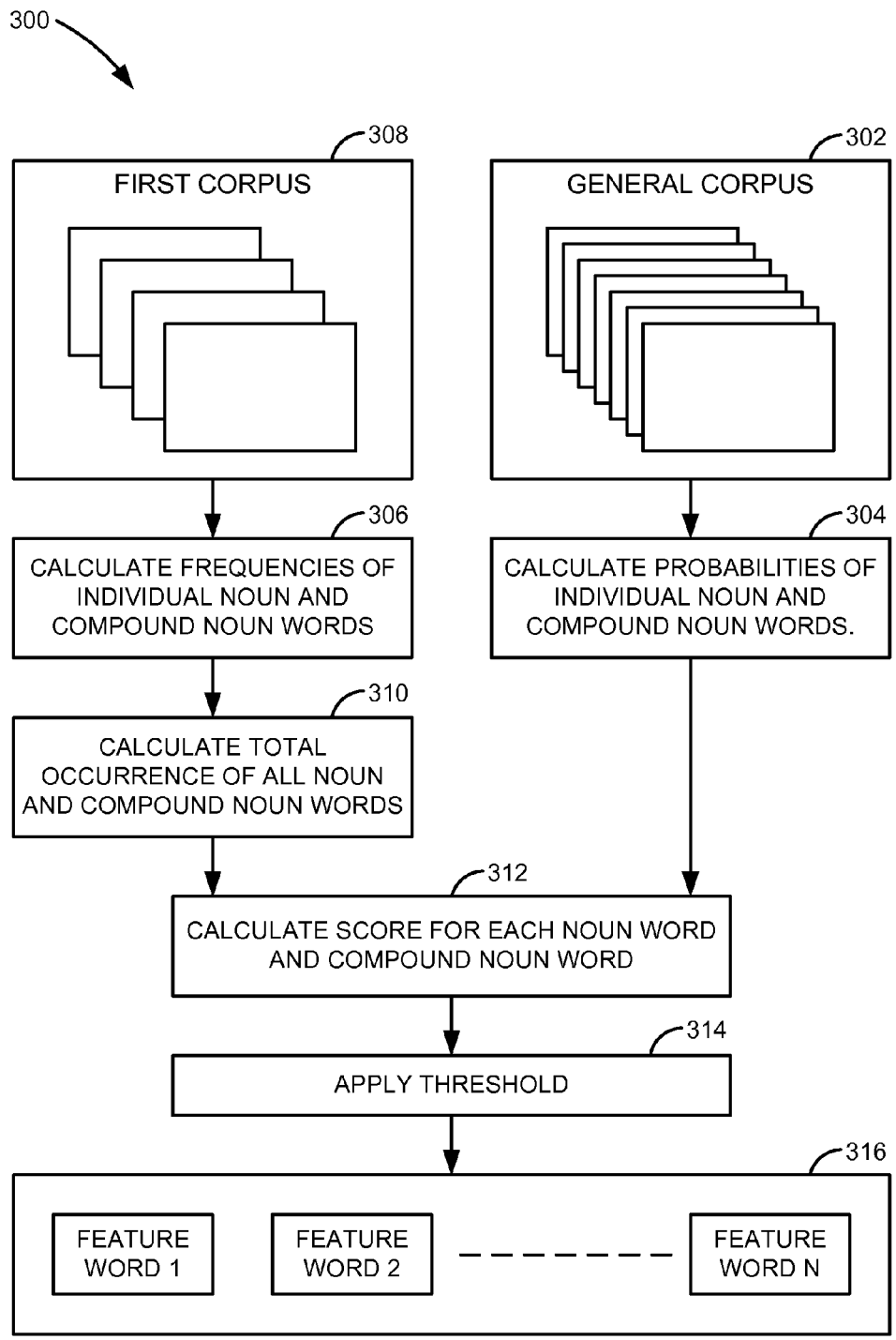
FIG. 3 is a block diagram illustrating a method for extracting feature words from the first corpus, according to one embodiment.

FIG. 3 illustrates a method 300 for extracting feature words as described in "Red Opal: Product-Feature Scoring From Reviews." Probabilities of occurrences of all possible noun or compound noun words from a general corpus 302 are generated at 304. The frequency of occurrences of a noun word 'x' or a compound noun word 'y' is calculated across the general corpus 302 and divided by total number of all occurrences of all noun words or compound noun words, respectively, across the general corpus 302 to generate individual probabilities of occurrences 'px' and 'py.' The probability 'px' is the probability of occurrence for the noun word 'x' and the probability 'py' is the probability of occurrence for the compound noun word 'y' in any general body text.

At 306, frequencies of each noun word and compound noun word in the first corpus 308 are calculated. For example, for the noun word 'x' or compound noun word 'y,' the frequency of all occurrences in the first corpus 308 is calculated and denoted as 'nx' and 'ny,' respectively. At 310, total occurrences of each noun word and each compound noun word are calculated. Frequencies of all the noun words within the first corpus 308 are added to generate the total noun word count 'N.' Similarly, frequencies of all the compound noun words within the first corpus 308 are also added to generate the total compound noun count 'H.'

At 312, scores are calculated for each noun word and compound noun word. For each noun word 'x,' a score is calculated using the following formula:

$$Score(x)=[nx-px \cdot N]-[nx \cdot ln(nx/(px \cdot N))]-[ln(nx)/2]$$

Where, ln is a natural logarithm function and the character '·' is a multiplication symbol.

For each compound noun word 'y,' a score is calculated using the following formula:

$$Score(y)=[ny-py \cdot H]-[ny \cdot ln(ny/(py \cdot H))]-[ln(ny)/2]$$

Where, ln is a natural logarithm function and the character '·' is a multiplication symbol.

A threshold is applied at 314. This threshold can be a qualitative estimate based on manual inspection of the feature words. As an example, noun words and compound noun words having a threshold score below −500 (e.g. −501, −502.25, −600, −1000 are all below −500—In Red Opal methodology only negative scores are obtained) are retained. At 316, noun words or compound noun words having a score more than a certain threshold value are retained as feature words. These retained feature words are the output of step 202 in FIG. 2.

Figure 4:
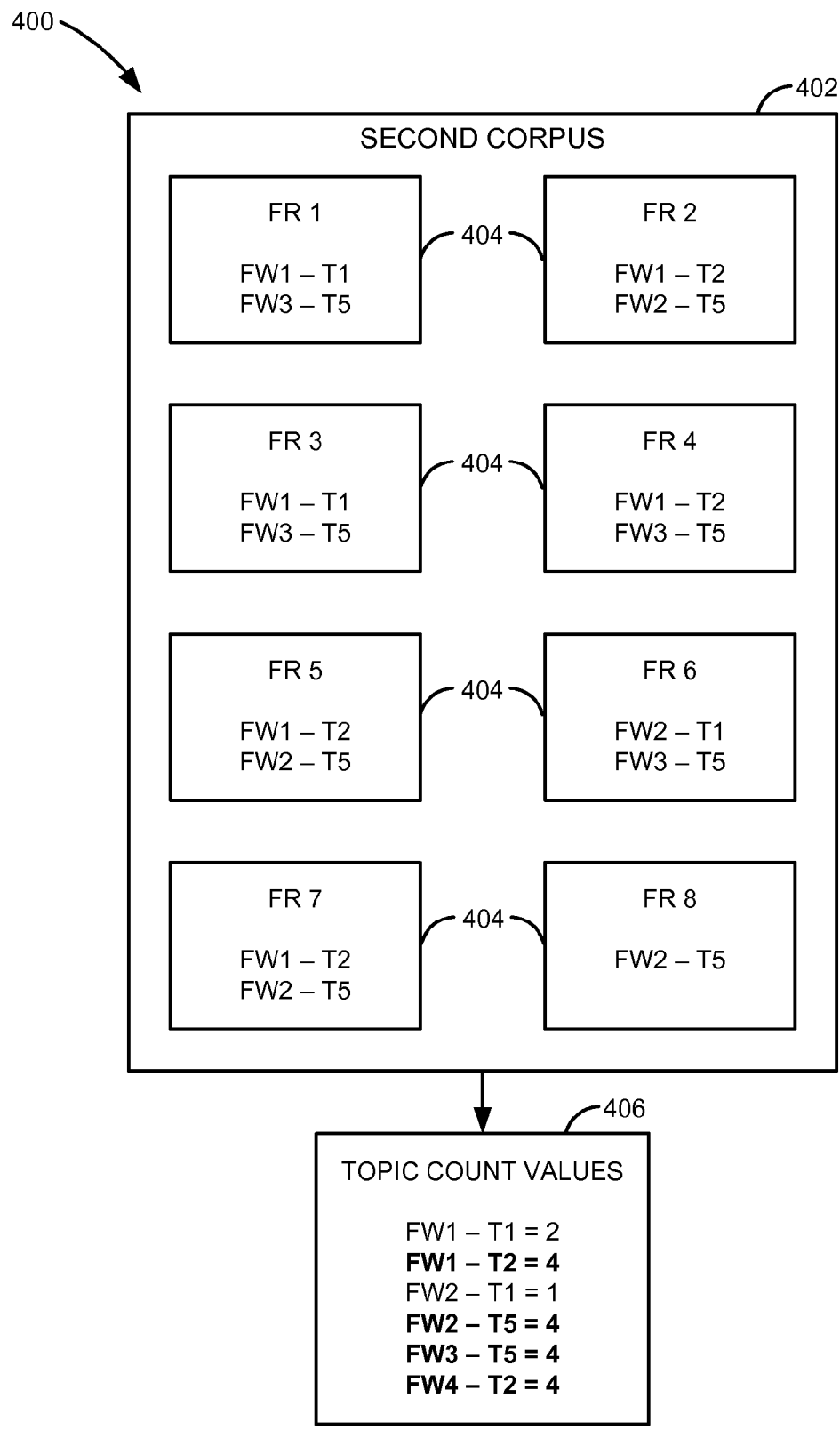
FIG. 4 is a block diagram illustrating topic count value determination, according to one embodiment.

FIG. 4 illustrates an embodiment 400 for determining topic count value. The second corpus 402 includes a plurality of filtered reviews 404. After topics are assigned for words in the second corpus 402 using techniques such as LDA, each feature word in each filtered review is associated with a topic. For example, in Filtered Review (FR) 1, Topic (T) 1 is assigned to Feature Word (FW) 1. In filtered review 5, T2 is assigned to FW1 and T5 is assigned to FW2. Similarly other filtered reviews in the second corpus 402 have feature words with assigned topics. For each feature word, a topic count for every topic is determined at 406. For example, T1 is assigned to FW1 two times in the second corpus 402 and T2 is assigned to FW1 four times in the second corpus 402. Therefore, for FW1, the topic count value for T1 is '2' and the topic count value for T2 is '4.' Similarly, for FW2, the topic count value for T1 is '1' and the topic count value for T5 is '4.' For FW3, the topic count value for T5 is '4.' For FW4, the topic count value for T2 is '4.'

Since the topic count value for T2 is '4' and is highest compared to other topic count values (i.e., T1=2), the topic T2 is assigned to FW1. For FW2, the topic count value for T5 is highest '4' and therefore T5 is assigned to FW2. For FW3, the topic count value for T5 is highest '4' and therefore T5 is also assigned to FW3. For FW4, the topic count value for T2 is highest '4' and therefore T2 is also assigned to FW4. The topics T2 and T5 are then presented as a group of feature words for which they are assigned, as shown in FIG. 5.

Figure 5:
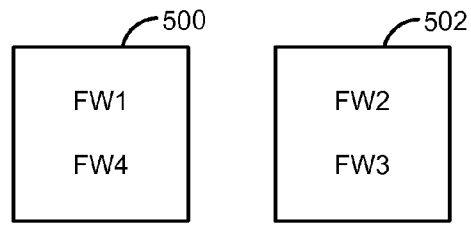
FIG. 5 is a block diagram illustrating topics that are presented based on the topic count values determined in FIG. 4, according to one embodiment.

Referring to FIG. 5, the topic T2 500 is presented as group of feature words including FW1 and FW4. The topic T5 502 is presented as group of feature words including FW2 and FW3. The combination of the feature words in a topic would implicitly indicate the notion of the topic. For example, FW1 and FW4, when viewed in combination would implicitly indicate the topic T2 500. Depending on the subject of the first corpus, each topic represents an implicit sense of a particular usage, purpose, or an aspect.

Figure 6:
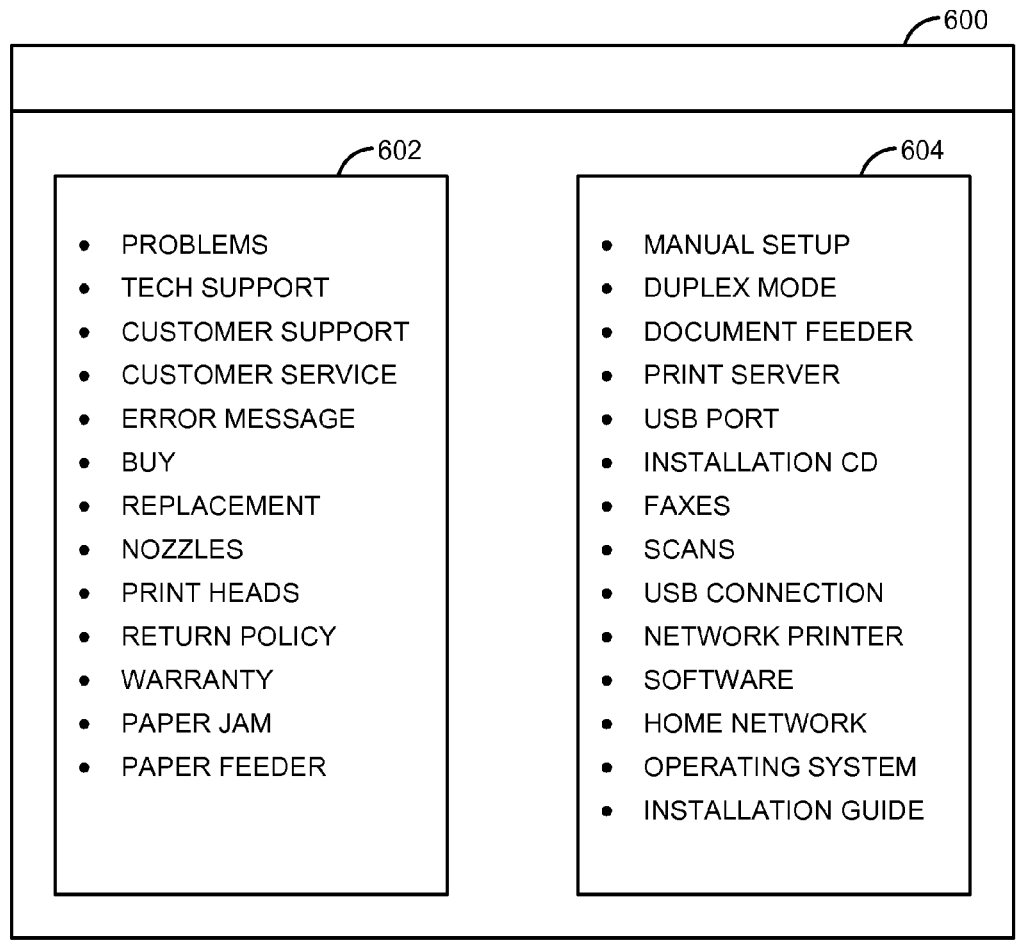
FIG. 6 illustrates an example of topics displayed as a group of feature words, according to one embodiment.

FIG. 6 illustrates an example of topics presented as a group of feature words on a user interface 600. In this example, the first corpus is a corpus of reviews about a printer. The first group 602 represents a topic and includes feature words such as problems, customer support, error message, replacement, print head, nozzle, warranty, paper jam, paper feeder, etc. Therefore, the topic of the first group 602 can be interpreted as 'printer issues,' which can be an aspect for the printer. The second group 604 includes feature words such as manual setup, sleep mode, document feeder, print server, installation CD, USB connection, software, home network, etc. Therefore, the topic of the second group 604 can be interpreted as a 'printer installation,' which is an aspect about the printer.

By extracting and grouping feature words from numerous reviews related to a subject, an overview of underlying topics pertaining to the reviews is provided to an end user on a user interface. Such analysis of reviews can be very valuable. For example, if the topics indicate problems associated with a product, appropriate actions can be taken to improve that product. The method for extracting and grouping feature words has applications in several areas. For example, the method can be used to analyze customer feedback data stored within a Customer Relationship Management (CRM) system. In a web based new product offering, consumers can quickly focus on the features of their interest and analyze sentiments pertaining to those features based on grouping of the features. The method can also be used for market sentiment analysis, brand value analysis, competitive analysis, and feature-specific sentiment analysis.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
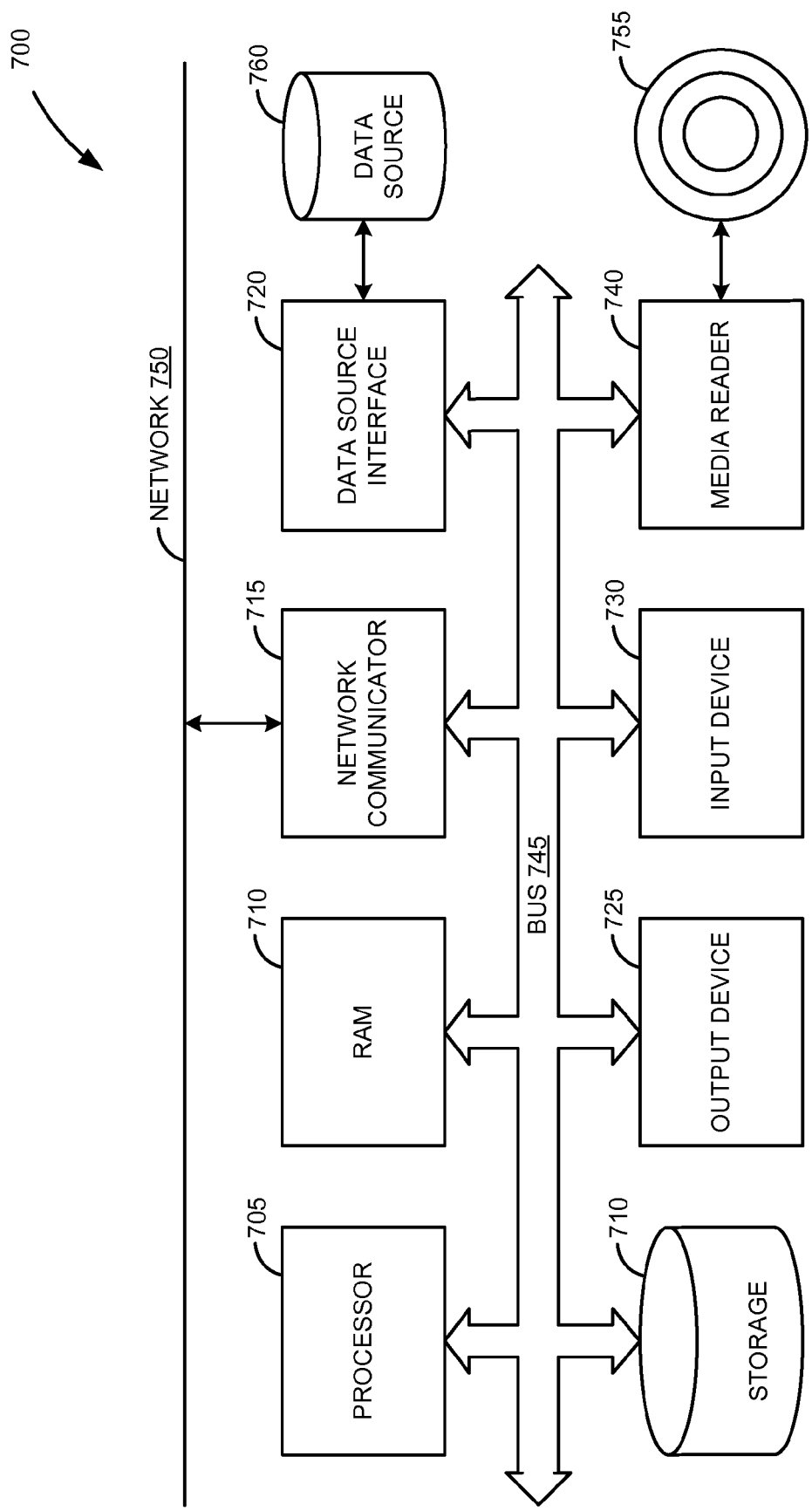
FIG. 7 is a block diagram of an exemplary computer system according to one embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   obtain feature words from a first corpus of text bodies comprising a plurality of reviews;
   create a second corpus using a combination of the obtained feature words, verbs and adjectives from the first corpus, wherein the second corpus comprises filtered reviews and each of the filtered reviews pertains to a review of the plurality of reviews;
   preliminarily assign topics for words in the filtered reviews of the second corpus;
   for the feature words in the second corpus, determine topic counts for preliminarily assigned topics;
   after determining the topic counts, finally assign one or more of the topics to the feature words based on a topic count value, comprising:
   assign the one or more topics that have a highest topic count value to the featuring words; and
   assign the one or more topics that have a threshold topic count value relative to the highest topic count value; and
   present on a user interface at least one topic as a group of the feature words for which the at least one topic is assigned based on the topic count value.

2. The article of manufacture of claim 1, wherein the instructions to obtain the feature words from the first corpus of text bodies, further comprises instructions to:
   extract feature words from the first corpus;
   obtain opinion fragments from the first corpus;
   determine a relative occurrence for each of the feature words based on occurrence of the feature words within the opinion fragments and within the first corpus; and
   retain one or more feature words having corresponding relative occurrences more than a predefined threshold.

3. The article of manufacture of claim 2, further comprising instructions, which when executed by a computer, cause the computer to:
   consider the feature words as occurring within the opinion fragments even when the feature words are referred in the opinion fragments by anaphora resolution.

4. The article of manufacture of claim 1, wherein the instructions to determine the topic count, further comprises instructions to:
   determine a particular topic count as an aggregate of the number of assignments of a particular topic to a particular feature word across all the filtered reviews in the second corpus.

5. The article of manufacture of claim 1, wherein the first corpus is a non-generic corpus of text bodies.

6. The article of manufacture of claim 1, wherein the feature words comprise compound words.

7. A computer-implemented method for grouping words, the method comprising:
   obtaining feature words from a first corpus of text bodies comprising a plurality of reviews;
   creating a second corpus using a combination of the obtained feature words, verbs and adjectives from the first corpus, wherein the second corpus comprises filtered reviews and each of the filtered reviews pertains to a review of the plurality of reviews;
   preliminarily assigning topics for words in the filtered reviews of the second corpus;
   for the feature words in the second corpus, determining topic counts for preliminarily assigned topics;
   after determining the topic counts, finally assigning one or more of the topics to the feature words based on a topic count value, comprising:
   assigning the one or more topics that have a highest topic count value to the feature words; and
   assigning the one or more topics that have a threshold topic count value relative to the highest topic count value; and
   presenting on a user interface at least one topic as a group of the feature words for which the at least one topic is assigned based on the topic count value.

8. The method of claim 7, wherein obtaining the feature words from the first corpus of text bodies, further comprises:
   extracting feature words from the first corpus;
   obtaining opinion fragments from the first corpus;
   determining a relative occurrence for each of the feature words based on occurrence of the feature words within the opinion fragments and within the first corpus; and
   retaining one or more feature words having corresponding relative occurrences more than a predefined threshold.

9. The method of claim 8, further comprises:
   considering the feature words as occurring within the opinion fragments even when the feature words are referred in the opinion fragments by anaphora resolution.

10. The method of claim 7, wherein determining the topic count comprises:
    determining a particular topic count as an aggregate of the number of assignments of a particular topic to a particular feature word across all the filtered reviews in the second corpus.

11. The method of claim 7, wherein the first corpus is a non-generic corpus of text bodies.

12. The method of claim 7, wherein the feature words comprise compound words.

13. A computer system for grouping words, comprising:
    a computer memory to store program code; and
    a processor to execute the program code to:
    obtain feature words from a first corpus of text bodies comprising a plurality of reviews;
    create a second corpus using a combination of the obtained feature words, verbs and adjectives from the first corpus, wherein the second corpus comprises filtered reviews and each of the filtered reviews pertains to a review of the plurality of reviews;
    preliminarily assign topics for words in the filtered reviews of the second corpus;
    for the feature words in the second corpus, determine topic counts for preliminarily assigned topics;
    after determining the topic counts, finally assign one or more of the topics to the feature words based on a topic count value, comprising:

assign the one or more topics that have a highest topic count value to the feature words; and assign the one or more topics that have a threshold topic count value relative to the highest topic value; and present on a user interface at least one topic as a group of the feature words for which the at least one topic is assigned based on the topic count value.

14. The system of claim 13, wherein the program code to obtain the feature words from the first corpus of text bodies, further comprises program code to:

extract feature words from the first corpus;

obtain opinion fragments from the first corpus;

determine a relative occurrence for each of the feature words based on occurrence of the feature words within the opinion fragments and within the first corpus; and retain one or more feature words having corresponding relative occurrences more than a predefined threshold.

15. The system of claim 14, wherein the processor further executes the program code to:

consider the feature words as occurring within the opinion fragments even when the feature words are referred in the opinion fragments by anaphora resolution.

16. The system of claim 13, wherein the program code to determine the topic count, further comprises program code to:

determine a particular topic count as an aggregate of the number of assignments of a particular topic to a particular feature word across all the filtered reviews in the second corpus.

17. The system of claim 13, wherein the first corpus is a non-generic corpus of text bodies.

18. The system of claim 13, wherein the feature words comprise compound words.

* * * * *